Figure 1:
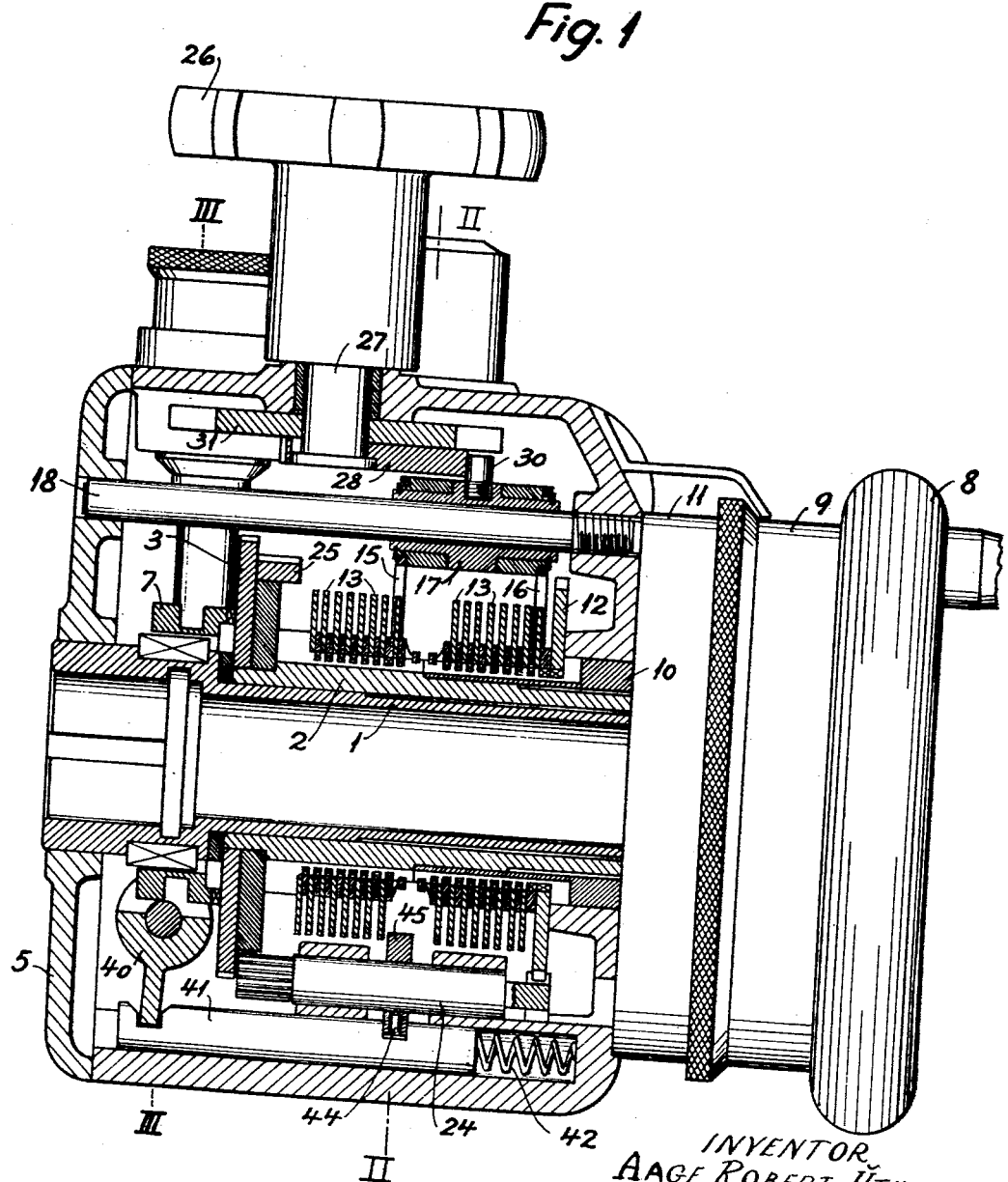

Aug. 31, 1954 A. R. UTH 2,687,663
STOPPING LIMITER FOR LATHE SLIDES AND THE LIKE
Filed July 12, 1950 5 Sheets-Sheet 4

INVENTOR:
AAGE ROBERT UTH
BY Richardson, David and Nordon
Attys

Aug. 31, 1954   A. R. UTH   2,687,663
STOPPING LIMITER FOR LATHE SLIDES AND THE LIKE
Filed July 12, 1950
5 Sheets-Sheet 5

INVENTOR:
AAGE ROBERT UTH
By Richardson, David and Nordon
attys

Patented Aug. 31, 1954

2,687,663

UNITED STATES PATENT OFFICE 2,687,663

STOPPING LIMITER FOR LATHE SLIDES AND THE LIKE

Aage Robert Uth, Copenhagen, Denmark

Application July 12, 1950, Serial No. 173,304

Claims priority, application Denmark July 28, 1949

8 Claims. (Cl. 82—21)

In machine tools it is of importance to be able automatically to stop the motion of the tool-carrying moving parts in predetermined positions. For instance, when turning down a work on a lathe to a specified thickness it is important to be able to limit the forward movement of the cross slide carrying the tool in such a way that the slide cannot be moved farther forward than corresponding to the desired thickness of the work. Thereby much working time may be saved, as the repeated stoppages in the machining for measuring the thickness attained, may be obviated. It will likewise be of importance by a simple switch-over to make the cross slide stop at different distances from the axis of rotation by previous adjustment, so that, for instance, when turning a stepped shaft it will be possible to switch over from one diameter to the diameter next following. The importance of such stopping device, especially in series production, will be evident. The invention relates to such an adjustable stopping device to limit the motion of mechanically moved slides in machine tools and the like machinery in which the slide is moved by means of a shaft or spindle, for instance, the forward motion of the cross slide of a lathe, but the apparatus may just as well be used to limit the motion of the carriage.

Certain known lathes are provided with a drum stop or turret stop with a number of adjustable stop screws by means of which the motion of the cross-slide may be blocked at positions corresponding to the desired turning diameters, but in these known stopping devices the stop is placed on the cross-slide, so that the pressure between stop and stop screw will be very considerable on account of the high ratio between the movement of the handwheel of the cross-slide spindle and the movement of the cross-slide proper. The consequence is that the elastic deformation of the connecting links between the handwheel with drum scale and the stop of the cross-slide will be great and uncontrollable, wherefore it will be difficult to attain even a rough accuracy as that of $\frac{1}{10}$ millimetre on the turned diameter.

These known devices are therefore quite unsuitable for precision turning, and when even reasonably accurate work is required repeated measurings of the thickness of the work during the turning cannot be avoided.

The invention provides a device in which the above-mentioned disadvantages are eliminated and which can work with absolute accuracy. Furthermore, it may be mounted on any ordinary lathe and may be rapidly and simply adjusted, no calculation being required in connection with the adjustment.

According to the invention the mechanism comprises a pawlwheel preferably fixed to the shaft or spindle and rotating with the latter, which pawlwheel cooperates with a pawl so controlled by an adjusting mechanism moved by the turning of the spindle as to keep the pawl disengaged from the pawlwheel until the slide by the turning of the spindle has been carried to a given position in which the pawl will engage behind one of the teeth of the pawlwheel and thereby prevent a further forward turning of the spindle.

By this means the aforementioned great elastic deformation between the stop and the driving gear will be obviated, for instance in the case of the cross slide of a lathe, the handwheel on its spindle, and the reading of the scale thereon will correspond exactly to the actual position of the turning tool.

In a suitable embodiment of the device according to the invention the turning of the pawl cooperating with the pawlwheel is determined by the position of two feelers each cooperating with a rotating notched disc driven by the turning of the spindle and provided with such a number of notches and so coupled to the spindle of the slide, that one disc requires one revolution of the spindle to turn it from a position with a notch in way of its feeler to the corresponding position next following, whereas in order to obtain the same result with the other disc several revolutions of the spindle will be required, so that the two discs when the slide has been carried to a position determined by their adjustment in relation to the spindle each will have a notch in way of its feeler, which at this position of the discs will enter each its notch and thereby permit the pawl to engage the pawlwheel.

In order beforehand to be able to adjust the stopping device to several different positions of the slide, between which a switching may be made by a simple turning of a lever or similar operating handle, the two notched discs may according to the invention belong each to its set of discs placed one behind the other and each set rotating as a whole, so, however, that the individual discs of the set may at the adjustment be turned independent of the other discs and of the spindle, along which sets of discs feelers are shiftably arranged in such a manner that they may be made to cooperate with any pair of discs consisting of the first, second, third, etc. disc of each of the two sets. According to the invention the transmission between the spindle of the slide and one set of discs may be so arranged that this set moves by steps when the spindle is rotating smoothly, one step for each rotation of the spindle. Thereby the result may be obtained that the notched disc serving to control the full revolutions of the spindle will have its notch in way of the feeler during the last part of the motion of the spindle, so that the pawl may engage the pawlwheel as soon as the notched disc serving to control fractions of revolutions of the spindle has its notch in way of its feeler.

For the above-mentioned shifting of the two feelers along the sets of notched discs the invention provides for a shifting mechanism so arranged and connected with the two feelers that by a handle they may be placed in way of the different pairs of discs determined by corresponding positions of rest of the shifting mechanism.

According to the invention the shifting mechanism may conveniently be provided with a turnable curved disc with notches situated at different distances from its centre of rotation to engage a guide tappet pressed against the curved disc by a spring, which guide tappet is connected with the lengthwise shiftable feelers, so that the position of the feelers in the direction of shifting corresponds to the distance between the notch in the curved disc engaging the steering tappet and the axis of rotation.

Figure 4:
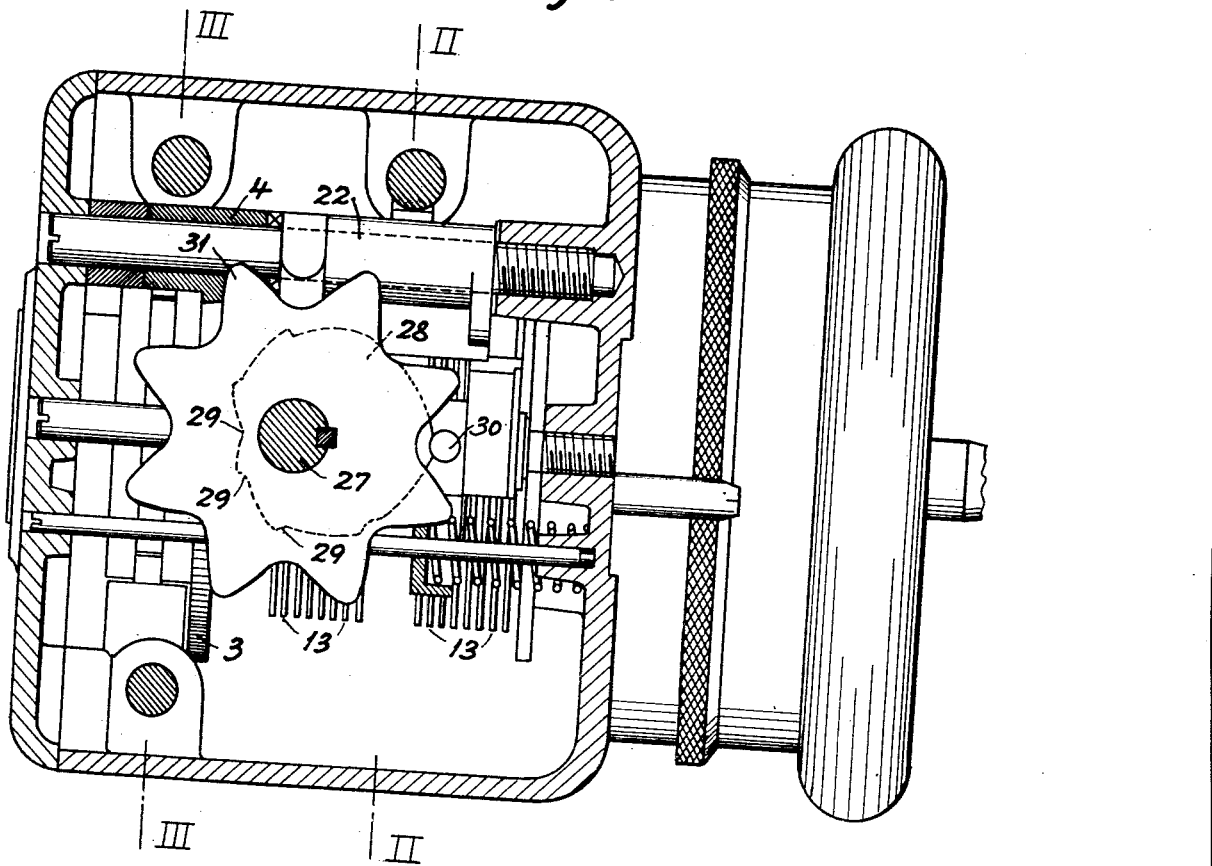
Figure 5:
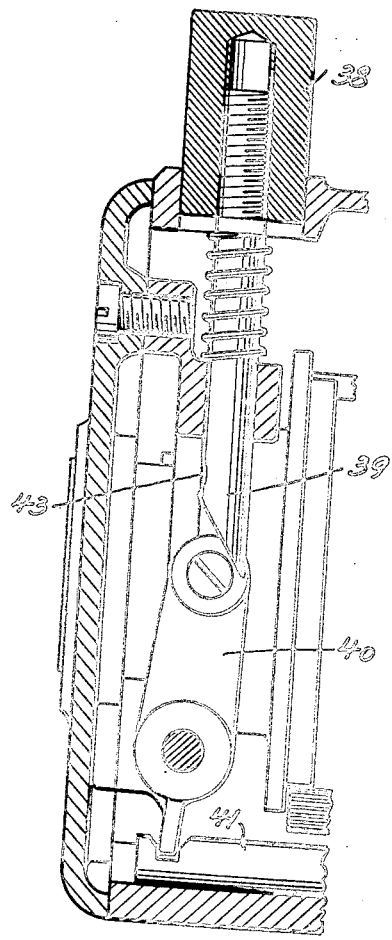

When pawlwheel and notched disc are placed concentrically on the spindle of the slide, the casing containing the pawl, feelers and shifting mechanism may according to the invention be turnably suspended on or concentrically with the spindle and its angle be adjustably fixed by an adjustment screw cooperating with a stationary part of the lathe. It will thereby be possible to turn the part to which pawl and feeler are attached a fraction of a turn corresponding to the pitch of the pawlwheel. If, for instance, by the use of the device on the cross-slide of a lathe the pitch of the pawlwheel corresponds to a movement of the cross-slide of ½₀ millimetre for each tooth, the various adjustments to which the mechanism may be set will give a difference in turning diameter of a full number of 1/10 of a millimetre. This will in case of most work be fully satisfactory, as in practice the measurements given are always in tenth of a millimetre. Only when the first step of, for instance a stepped shaft, is to be turned it will be of importance to be able to adjust the motion of the cross-slide with greater accuracy as regards the adjustment of the mechanism, as explained in the following, and for this purpose serves the above-mentioned adjustment screw, which may, for instance be provided with graduations corresponding to a cross-slide movement of 1/100 millimetre. In the following the invention is explained in detail under reference to the drawing which shows an embodiment of an adjustable stopping device used in connection with the cross-slide of a lathe, and in which Fig. 1 shows a longitudinal section through the mechanism, axially in relation to the spindle of the cross-slide, Fig. 2 a cross-section on the line II—II in Figs. 1 and 4, Fig. 3 a cross-section on the line III—III in Figs. 1 and 4, Fig. 4 a horizontal section on the line IV—IV in Fig. 2, and Fig. 5 a vertical, longitudinal section on the line V—V in Fig. 3.

In Fig. 1 1 is a shaft in extension of the spindle of the cross-slide and firmly connected therewith.

Figure 3:
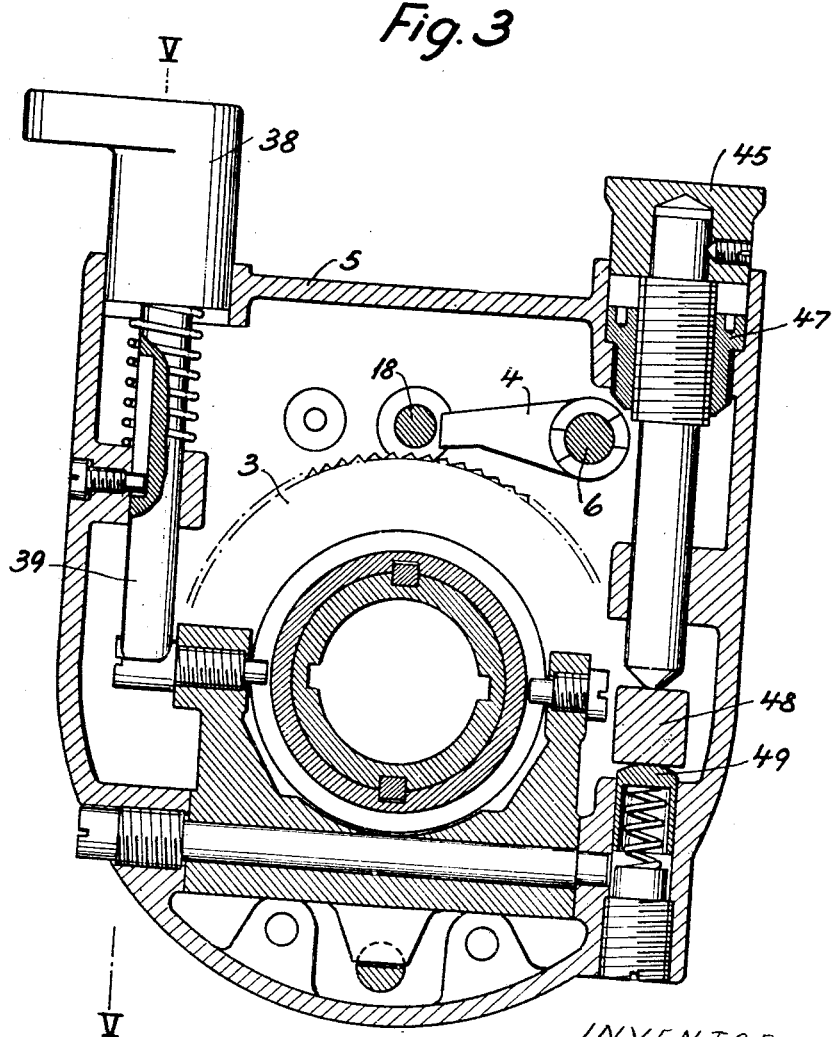

On shaft 1 a turnable, hollow shaft 2 is inserted, which carries a pawlwheel 3, see Fig. 3. The pawlwheel may cooperate with a pawl 4, pivoted on an axle 6, fixed in the casing of the mechanism and actuated by a spring not shown in the drawing which tends to press the pawl up against the pawlwheel 3. The forward surface of the pawlwheel is so arranged that it may engage the teeth of a coupling partner 7, shiftable along the shaft 1, and by means of which shafts 1 and 2 may be coupled firmly together, and at its opposite end shaft 2 is provided with a handwheel 8 with a graduated scale on its drumshaped part 9.

Figure 2:
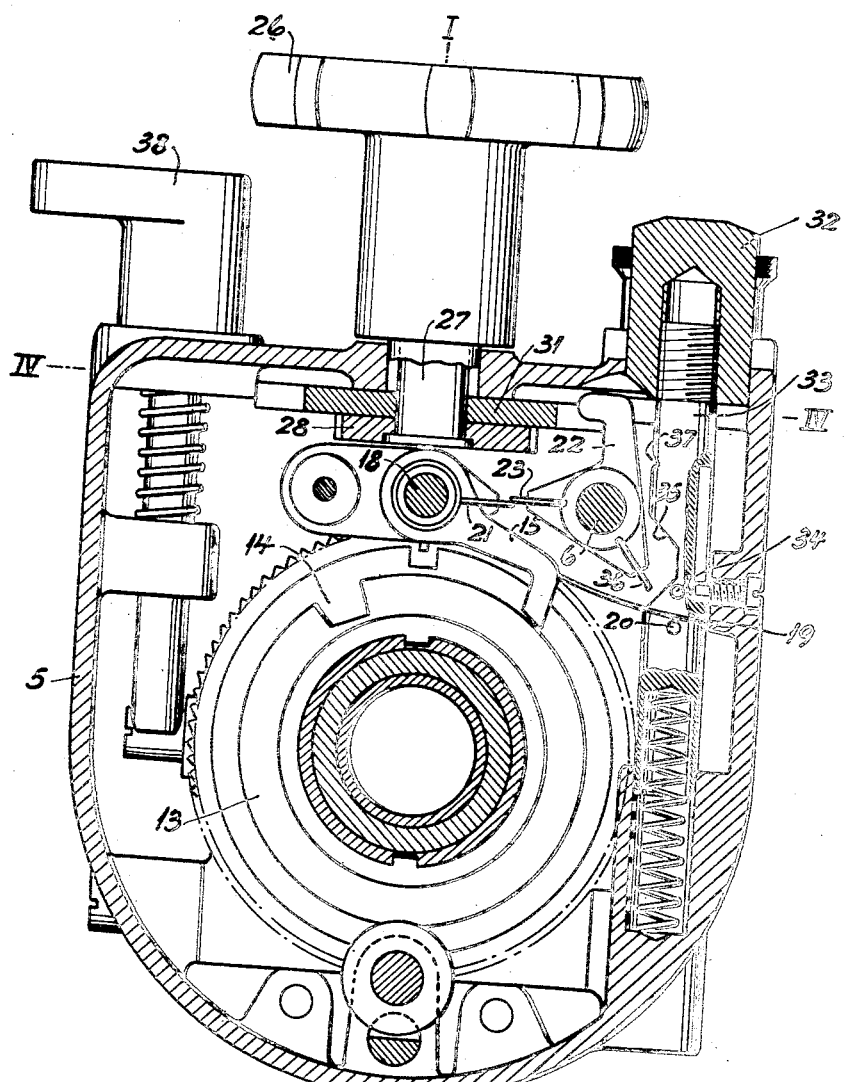

Over part of shaft 2 and turnably on the latter is inserted another hollow shaft 10, to which is affixed an adjustment drum 11, with a graduated scale and a gear-wheel 12. On each of shafts 2 and 10 is inserted a set of notched discs 13, consisting of eight discs which as shown in Fig. 2 are provided with notches 14 along their circumference. These discs are held in place by friction, so that the individual disc may be turned in relation to the rest and to the shaft on which it is placed.

In way of each set of discs, or more accurately, in way of a corresponding disc in each set a feeler 15 or 16 is placed, turnably mounted on a common holder 17, which is shiftably placed on a shaft 18. The end of the feeler is formed as a hook fitting into notches 14 on the notched disc 13, but the feeler is prevented from engaging the notch by flat spring 19, affixed to each feeler and pressing against a stop rod 20, tending to turn the feeler away from the notched disc. This turning movement is limited by a fixed stop rod 21 on the feeler, which rod rests against a stop plate 23 fixed to a release 22, and of such width that it may simultaneously serve as a stop for the stop rods 21 of both feelers. The release 22 is turnably mounted on axle 6, to which also pawl 4 is fixed and actuated by a spring not shown in the drawing so that through the stop plate 23 and the stop rods 21 it forces the feelers 15 and 16 in against their notched discs 13 with sufficient force to overcome the resistance of the flat spring 19. The hub of the release 22, placed on the axle 6, is so coupled to the hub of the pawl 4 that the latter at the position of the release shown is kept disengaged from the pawlwheel 3, but which at the commencement of an anti-clockwise turn of the release will engage the pawlwheel.

When the notched discs on shafts 2 and 10 by a turn of the handwheel 8 are turned in such a way that a notch 14 is in way of each of the feelers 15 and 16, the hooks of the latter will engage the notches 14, and at the same time the pawl 4 will engage the pawlwheel 3, and the extreme edge of the stop-plate 23 will slip by the end of the stop rods 21 so that the release 22 may continue its turning movement until it stops by its hook striking against a curved disc which will be further described in the following. The turning of shaft 1 and thereby the forward movement of the cross-slide, has now been stopped.

As far as the notched discs placed on shaft 2 are concerned, a notch 14 will coincide with the feeler 15 once for each revolution of the handwheel 8. As regards the notched discs on shaft 10 the same thing will occur once for each turn of that shaft. The gear wheel 12 fixed to shaft 10 engages the geared part of a shaft 24, the other end of which is likewise geared and engages a single tooth 25 on the side of the pawl-wheel 3. Shaft 24 will therefore turn one tooth space for each turn of the handwheel 8, and by a suitable ratio between this shaft and the gearwheel 12 the result may be attained that a turn of the shaft 10, with the notched discs fitted thereon will correspond to an advance of the cross-slide of a suitable number of full millimetres. It is observed, that the turning of shaft 10 with its notched discs takes place stepwise, so that the shaft will be at a standstill while shaft 2 with the pawlwheel 3 makes a full revolution.

If the pitch of the threads of the cross-slide spindle is, for instance, 4 millimetres and the pawlwheel is provided with 80 teeth, the pawl will be able to stop the slide in one turn of the handwheel 8 at any 20th of a millimetre within the total advance of 4 millimetres, according to the adjustment of the notched disc 13, cooperating with feeler 15, in relation to shaft 2. Thus, the device may adjust to a turning diameter of tenth parts of millimetres within a diameter difference of 8 millimetres, provided that the notched disc on shaft 10 cooperating with feeler 16 has its notch coinciding with the feeler. If the ratio between shaft 24 and gearwheel 12 is such that the latter will turn 1/80 revolution for each turn of the pawlwheel 3, 80 revolutions of the handwheel 8 will be required to turn shaft 10 with its notched discs one revolution, corresponding to an advance of the cross-slide of 80×4=320 millimetres. It will thus be possible at will by adjustment of the notched discs 13, cooperating with feelers 15 and 16, to choose any point at intervals 1/20 millimetre within a length of advance of 320 millimetres, at which the two notched discs cooperating with the feelers have their notches coinciding with the feelers and at which, in other words, the pawl 4 will stop the further advance of the cross-slide.

The device shown may be adjusted to 8 such points corresponding to the 8 notched discs in each set of discs. In order to change the mechanism from one adjustment to another it will only be necessary to shift the holder 17 on shaft 18 until the feelers coincide with the next pair of discs. This shifting is performed by means of an adjusting handle 26 fastened to a turnable shaft 27, to which is also affixed a curved disc 28, with eight notches 29 at different distances from the axis of rotation. A fixed tappet 30 on the holder 17 is by means of a spring not shown pressed in against the curved disc 28, and when the tappet engages the different notches 29 feelers 15 and 16 will be in way of corresponding discs of the eight pair of notched discs. The shaft 27 is likewise provided with a star-shaped, curved disc 31, the eight points of which will be in way of the middle of the intervals between the notches 29.

After the release of pawl 4, the stop-plate 23 on the release 22, will, as previously explained, be situated below the stop rods 21 on feelers 15 and 16. By a change to the next adjustment, the adjusting handle 26, and thereby the star-shaped, curved disc 31, will turn and the point of the latter will impinge against a stop-hook on the release 22, and in passing turn it so that the stop-plate 23 will again slip by the stop rods 21, whereby these parts will again be in their original positions. At the same time tappet 30 has entered the next notch 29, and the holder 17 has been shifted so that feelers 15 and 16 will coincide with the next pair of notched discs.

By the adjustment of discs 13 to the desired turning diameters, feelers 15 and 16 are first released from stop-plate 23, and the connection between shaft 1 and shaft 2 and between the latter and shaft 10 is interrupted. Feelers 15 and 16 are released by pressing a stop button 32 at the end of a spring-loaded rod 33, to which are fastened stop rod 20 and a corresponding stop rod 34. When rod 33 is depressed stop rod 34 will press against the flat spring 19, which thereby tends to press feeler 15 in against the notched discs 13. At the same time a collar 35 on rod 33 will press against a stop-plate 36 on the release 22 and turn the latter and thereby also pawl 4 in direction away from the pawlwheel, and as stop-plate 36 slides into a notch 37 in rod 33 the latter will be held in its depressed position and the release in its turned position.

Shaft 2 is uncoupled from shaft 1 by taking the coupling partner 7 away from the pawlwheel 3, which is done by pressing down a spring-loaded coupling button 38 with a rod 39 cut off obliquely at bottom, so that when depressed it may move one arm of a two-armed lever 40, engaging the coupling partner 7 to one side. The other arm of lever 40 engages a shiftable rod 41, which thus when the coupling partner 7 is released will be carried to the right (see Fig. 1) against the pressure of a spring 42, which in this way counteracts the uncoupling. The pressure rod 39 is provided with a notch 43 which keeps it in depressed position. The rod 41 is provided with a recess 44, into which a ring 45 on shaft 24 fits, so that this shaft will be shifted together with rod 41. By the abovementioned shifting to the right the toothed right end of shaft 24 is disengaged from gearwheel 12. Thereby the transmission between shafts 2 and 10 is interrupted.

With the feelers coinciding with the first set of notched discs, handwheel 8 and drum 11 are now separately turned until the feelers drop in to their notches, which they can do only one by one, as each feeler is pressed in against the notched discs by their springs 19, because the stop button 32 is depressed. When the feelers in the notches of the notched discs drum 11 and handwheel 8 are now turned until the reading on the graduated scale corresponds to the desired turning diameter. During this turning movement the two notched discs engaged by the feelers will stand still and shafts 2 and 10 will turn overcoming the friction of these discs.

Next the adjusting handle 26 is turned to the next position of rest of tappet 30, but before the tappet has as yet commenced to shift, a point on the star-shaped, curve disc 31 will press against the release 22 and disengage it from rod 33, which by its spring is pressed up into its original position, whereby stop rod 20 is made to press against the flat springs 19 on the feelers, which thereby disengage the notched discs, so that the shifting of the holder 17, caused by the passage of tappet 30 to the next notch 29, may be unimpeded. The feeler is now in way of the next pair of discs and the adjustment of the latter takes place in exactly the same manner as above described, the stop button 32 having first been depressed. Continue in the same manner with the other adjustments, of which in the embodiment described a total of eight may be made each corresponding to its pair of notched discs, but there is, of course, nothing to prevent the use of a greater number of notched discs.

The shafts are now again coupled up by raising the coupling button 38 to its original position, while at the same time a turn of the adjusting lever 26 ensures that the feelers are disengaged from the notched discs. By turning the work fixed in the lathe using the stop positions determined by the adjustment of the discs, the right difference in diameter will be obtained, but the initial diameter may be of any size. In order to obtain the correct size a cylindrical machining of the work is made with shafts coupled up and the turning steel in a suitable position in the tool-holder of the cross-slide, whereupon the diameter obtained is gauged, and on depression of coupling button 32 drum 11 and handwheel 8 are so adjusted that the reading of the scale corresponds to the diameter measured in tenths of millimetres. The shafts are then again coupled together by lifting the coupling button 38. The device is now set to turning the right diameters, subject, however, in some cases to an error of not exceeding $\frac{1}{10}$ millimetre on all these diameters and in the same direction, namely the difference between the diameter of the initial trial turning and the next measure of $\frac{1}{10}$ millimetre either way.

In order to correct this error the whole casing 5 is turned on the axle system 1, 2, 10 in which it is suspended. This turning is done by means of a micrometer graduated adjusting screw 46, taken through a screw bushing 47, affixed to the casing 5, and resting with one end against a fixed rod 48, projecting from the apron of the slide, which apron is not shown in the drawing.

A spring-loaded button 49, attached to the casing 5, presses against the other end of rod 48, so that the casing 5 is kept in the position determined by the adjusting screw 46. The head of the adjusting screw 46 may, for instance, be so graduated that a difference in reading of 20 graduations corresponds to a turning of the casing of the order of one tooth-space of the pawling wheel 3, or $\frac{1}{80}$ revolution. It will thereby be possible to make an exact adjustment to turning diameters with an accuracy of $\frac{1}{100}$ millimetre. There is, however, nothing to prevent an adjustment with even greater accuracy. As mentioned in the foregoing the embodiment shown is only to be considered an example, and the invention may be applied to other slide motions and the construction may be different from that shown.

Having thus described my invention what I claim is:

1. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder, two feelers rotatably carried by said holder and being coupled to said tipping member and thereby pressed against the circumference of the discs of each said set and engaging the notches thereof, when both notches coincide with the respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide.

2. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder, two feelers rotatably carried by said holder and being coupled to said tipping member and thereby pressed against the circumference of the discs of each said set and engaging the notches thereof, when both notches coincide with the respective feelers, said tipping member being thereby uncoupled from said feelers and due to its spring actuation simultaneously tipped, a spring actuated stoping pawl, a ratchet wheel carried by said driving spindle, said stopping pawl coming into engagement with said ratchet wheel upon tipping of said tipping member and preventing further forward movement of the slide, a projection on each of said feelers, a spring actuated member, coupling members actuated by said spring member for causing the feelers to be pressed against the circumference of said notched discs, a spring device acting permanently on said feelers counteracting the pressing of the feelers but of insufficient strength to prevent the feelers being pressed against the discs, said feelers being by the tipping movement of said tipping member when said feelers engage the notches in said discs delivered from the action of said spring actuated member, the coupling elements being by this movement brought out of engagement, said spring device being thus enabled to bring said feelers out of engagement with said notches.

3. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder two feelers rotatably carried by said holder and being coupled to said tipping member and thereby pressed against the circumference of the discs of each said set and engaging the notches thereof, when both notches coincide with the respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide, the two sets of discs being coaxially arranged, one set behind the other, each set rotating as a collective whole, the individual discs of each set being adjustably turnable independently of the other discs, the two feelers cooperating with said discs being arranged slidable along a line parallel with the axis of said discs so as to bring simultaneously in alignment each feeler respectively with a disc of each set of discs.

4. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder two feelers rotatably carried by said holder and being coupled to said tipping member and thereby pressed against the circumference of the discs of each said set and engaging the notches thereof, when both notches coincide with respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide, the two sets of discs being setwise cooperatively coupled to the driving spindle, the transmission between said spindle and one of said sets of discs being so arranged that the set of discs will move stepwise when the driving spindle is rotated continuously.

5. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder two feelers rotatably carried by said holder and being coupled to said tipping member and thereby pressed against the circumference of the discs of each said set and engaging the notches thereof, when both notches coincide with the respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide, the two sets of discs being coaxially arranged, one set behind the other, each set rotating as a collective whole, the individual discs of each set being adjustably turnable independently of the other discs, the two feelers cooperating with said discs being arranged slidably along a line parallel with the axis of said discs so as to bring simultaneously in alignment each feeler respectively with a disc of each set of discs, the feelers being slidably arranged, an operating handle connected with the feelers to bring them in alignment alternately with corresponding pairs of the notched discs.

6. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder two feelers rotatably carried by said holder and being coupled to said tipping member and thereby pressed against the circumference of the discs of each said set and engaging the notches thereof, when both notches coincide with the respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide, the two sets of discs being coaxially arranged, one set behind the other, each set rotating as a collective whole, the individual discs of each set being adjustably turnable independently of the other discs, the two feelers cooperating with said discs being arranged slidably along a line parallel with the axis of said discs so as to bring simultaneously in alignment each feeler respectively with a disc of each set of discs, the feelers being slidably arranged, an operating handle connected with the feelers to bring them in alignment alternately with corresponding pairs of the notched discs, a curved disc connected to said handle and turned with the same, said disc having notches at different distances from its axis of rotation, a spring loaded guide tappet cooperating with said notches and being pressed against said curved disc, said guide tappet being connected with the slidably arranged feelers as to bring them in alignment with the different notched discs when said guide tappet rests in the notches of said curved disc, the feelers being shifted from one position to another by turning said curved disc by means of said handle.

7. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder two feelers rotatably carried by said holder and being coupled to said tipping member and thereby pressed against the circumference of the discs of each said set and engaging the notches thereof when both notches coincide with the respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide, the two sets of discs being coaxially arranged, one set behind the other, each set rotating as a collective whole, the individual discs of each set being adjustably turnable independently of the other discs, the two feelers cooperating with said discs being arranged slidably along a line parallel with the axis of said discs so as to bring simultaneously in alignment each feeler respectively with a disc of each set of discs, the feelers being slidably arranged, an operating handle connected with the feelers to bring them in alignment alternately with corresponding pairs of the notched discs, a curved disc connected to said handle and turned with the same, said disc having notches at different distances from its axis of rotation, a spring loaded guide tappet cooperating with said notches and being pressed against said curved disc, said guide tappet being connected with the slidably arranged feelers as to bring them in alignment with the different notched discs when said guide tappet rests in the notches of said curved disc, the feelers being shifted from one position to another by turning said curved disc by means of said handle, a casing carrying the stopping pawl, and an adjusting screw adjustably holding the casing in fixed angular position.

8. An adjustable stopping device for limiting the forward motion of a slide in machine tools and similar members in guidings, comprising a rotary driving spindle, two sets of notched discs individually driven by said spindle, one set rotating more slowly than the other set, a spring actuated tipping member, a slidable holder two feelers rotatably carried by said holder and being coupled to said tipping member and thereby pressed against the circumference of the discs of each said set and engaging the notches thereof, when both notches coincide with the respective feelers, said tipping member being thereby uncoupled from said feelers and due to its spring actuation simultaneously tipped, a spring actuated stopping pawl, a ratchet wheel carried by said driving spindle, said stopping pawl coming into engagement with said ratchet wheel upon tipping of said tipping member and preventing further forward movement of the slide, the two sets of discs being coaxially arranged, one set behind the other, each set rotating as a collective whole, the individual discs of each set being adjustably turnable independently of the other disc, the two feelers cooperating with said discs being arranged slidably along a line parallel with the axis of said discs so as to bring simultaneously in alignment each feeler respectively with a disc of each set of discs, the feelers being slidably arranged, an operating handle connected with the feelers to bring them in alignment alternately with corresponding pairs of the notched discs, a curved disc connected to said handle and turned with the same, said disc having notches at different distances from its axis of rotation, a spring loaded guide tappet cooperating with said notches and being pressed against said curved disc, said guide tappet being connected with the slidably arranged feelers as to bring them in alignment with the different notched discs when said guide tappet rests in the notches of said curved disc, the feelers being shifted from one position to another by turning said curved disc by means of said handle, a star-shaped disc carried by said handle and revolving with said curved disc, a release cooperating with the handle, said release by the action of the points of the star-shaped disc upon turning actuating the tipping member to bring this member into coupling engagement with the feelers and the stopping pawl out of engagement with the ratchet wheel.

References Cited in the file of this patent

UNITED STATES PATENTS

| Number | Name | Date |
|---|---|---|
| 1,768,495 | Shcroder | June 20, 1930 |
| 1,950,039 | Smith et al. | Mar. 6, 1934 |
| 2,040,025 | Slye | May 5, 1936 |
| 2,105,962 | Bickel | Jan. 18, 1938 |
| 2,318,305 | Groene | May 4, 1943 |
| 2,348,908 | Jacobs | May 16, 1944 |
| 2,362,275 | Jacobs | Nov. 7, 1944 |

FOREIGN PATENTS

| Number | Country | Date |
|---|---|---|
| 116,474 | Sweden | May 28, 1946 |